United States Patent [19]

Connors, Jr.

[11] Patent Number: 5,435,915

[45] Date of Patent: Jul. 25, 1995

[54] CONNECTOR FOR SEALING STACKED FILTER ELEMENTS

[75] Inventor: James T. Connors, Jr., Groton, N.Y.

[73] Assignee: Pall Corporation, East Hills, N.Y.

[21] Appl. No.: 866,841

[22] Filed: Apr. 10, 1992

[51] Int. Cl.⁶ .......................................... B01D 27/08
[52] U.S. Cl. .................................. 210/232; 210/450; 210/458; 210/DIG. 17; 55/484; 55/502
[58] Field of Search .................... 210/232, 253, 325.2, 210/340, 437, 446, 448, 450, 457, 458, DIG. 17; 55/484, 502

[56] References Cited

U.S. PATENT DOCUMENTS

| | | |
|---|---|---|
| Re. 29,477 | 10/1977 | Farrow et al. . |
| 477,796 | 6/1892 | Fleming . |
| 2,593,227 | 4/1952 | Wagner . |
| 2,868,383 | 1/1959 | Nicolls . |
| 3,246,920 | 4/1966 | Pall . |
| 3,300,049 | 1/1967 | Hardcastle . |
| 3,344,923 | 10/1967 | Pall et al. . |
| 3,481,472 | 12/1969 | Petri . |
| 3,503,511 | 3/1970 | Spitzberg . |
| 3,767,054 | 10/1973 | Farrow et al. . |
| 3,868,325 | 2/1975 | Otto . |
| 3,957,644 | 5/1976 | Edmonson . |
| 3,986,960 | 10/1976 | Wire et al. . |
| 3,993,561 | 11/1976 | Swearingen . |
| 4,052,307 | 10/1977 | Humbert, Jr. . |
| 4,071,444 | 1/1978 | Ash et al. . |
| 4,105,562 | 8/1978 | Kaplan et al. . |
| 4,170,556 | 10/1979 | Pall . |
| 4,176,815 | 12/1979 | Davidson et al. . |
| 4,228,012 | 10/1980 | Pall . |
| 4,237,010 | 12/1980 | Zimmerly . |
| 4,259,097 | 3/1981 | Patel et al. . |
| 4,336,043 | 6/1982 | Aonuma et al. . |
| 4,421,170 | 12/1983 | Swift, Jr. et al. . |
| 4,422,790 | 12/1983 | Gebert et al. . |
| 4,451,369 | 5/1984 | Sekino et al. . |
| 4,473,471 | 9/1984 | Robichaud et al. . |
| 4,517,085 | 5/1985 | Driscoll et al. . |
| 4,559,138 | 12/1985 | Harms, II . |
| 4,609,465 | 9/1986 | Miller . |
| 4,670,145 | 6/1987 | Edwards . |
| 4,707,262 | 11/1987 | Murken . |
| 4,735,716 | 4/1988 | Petrucci et al. . |
| 4,740,299 | 4/1988 | Popoff et al. . |
| 4,759,845 | 7/1988 | Selesnick . |
| 4,802,979 | 2/1989 | Medley, III . |
| 4,810,379 | 3/1989 | Barrington . |
| 4,855,046 | 8/1989 | Meehan . |
| 4,871,455 | 10/1989 | Terhune et al. . |
| 4,881,313 | 11/1989 | Artinyan et al. . |
| 5,205,994 | 4/1993 | Janik ..................... 210/232 |
| 5,259,953 | 11/1993 | Baracchi et al. ............. 210/232 |

FOREIGN PATENT DOCUMENTS

| | | |
|---|---|---|
| 616962 | 3/1961 | Canada . |
| 39 21 369.2 | 6/1989 | Germany . |
| 1306358 | 2/1973 | United Kingdom . |

Primary Examiner—Robert A. Dawson
Assistant Examiner—W. L. Walker
Attorney, Agent, or Firm—Leydig, Voit & Mayer, Ltd.

[57] ABSTRACT

A novel sealing connector is provided for sealing a stack of filter units in a filter housing. The sealing connector has a base portion, a compression generating member, and an attachment member for selectively attaching the base portion to the end of a filter unit. The attachment member and the connecting portion of the end connector resiliently cooperate to permit latch members of the attachment member and the end connector to slide past each other and overlap in a radial direction when an axial force is exerted on the aligned latch members for integrally attaching the sealing connector to the end connector. In one illustrated embodiment, the sealing connector has a female attachment member for attaching to a male connecting portion of a male end connector. The female attachment member has a connecting portion formed by an outer wall, which extends along the outer periphery of the base and extends outwardly from the base portion, and a flange, which extends from the end of the wall in the radial direction of the base portion. The outer wall and flange form a socket for receiving the male connecting portion of the end connector.

28 Claims, 6 Drawing Sheets

CONNECTOR FOR SEALING STACKED FILTER ELEMENTS

FIELD OF THE INVENTION

This invention relates to filtration devices and more particularly to a spring sealing mechanism for sealing filter units in filter housings.

BACKGROUND OF THE INVENTION

In many filtration systems, filter units are used in a variety of filter housings to clarify influent fluids by allowing them to pass through a filter medium. The filter housings vary in their configurations and can be very deep or very long. Typically, filtration systems employ a modular concept in which a plurality of short filter units are manufactured and then, at the time of installation in the filter housing, connected end to end using an end connector system to form a stack of filter units having the necessary length. An example of a unique end connector system is described in U.S. Pat. No. 5,141,637 to Reed et al. Similarly, a stack of the connected filter units can be installed in the filter housings in the requisite number of rows.

Since the filter housing defines the flow path into and out of the filter units, the stacks of the connected filter units must be properly sealed inside the filter housing in order to prevent influent fluid from bypassing the filter unit to the downstream clean side without first passing through the filter medium. Therefore, filter housings must employ a mechanism for sealing the filter unit prior to fluid clarification.

Two typical sealing mechanisms are the tie rod system and the spring loaded system. Other mechanisms involve the use of elastomeric piston type seal geometries.

In the typical tie rod sealing mechanism, the hollow core of the filter stack is installed over a tie rod in the filter housing. Thereafter, a seal nut is threaded onto the tie rod thereby creating an axial load on filter seals and a fluid-tight connection between the ends of the individual filter units.

Unfortunately, the tie rod system has several disadvantages. Since the tie rod is inserted through the hollow core of the filter stack, the tie rod may interfere with the flow rate through the filter. The tie rod system is also relatively expensive because the tie rod system, which is physically attached to the base of the filter housing, must be designed in conjunction with the filter housing. Furthermore, installation of the tie rod is relatively time consuming.

In the typical spring-loaded sealing mechanism, the connected stacks of filters are installed into the filter housing and a spring-loaded sealing cup is placed on top of the filter stack so that it loosely interfaces with the end of the filter unit. When the housing cover is closed, the spring is compressed thereby providing an axial load onto filter seals and creating a fluid-tight connection between the edges of the sealing cup and the end of the filter unit.

The spring-loaded sealing cup also has several disadvantages. Because the sealing cup loosely interfaces with the filter unit, it is not uncommon for the sealing cup to fall off or otherwise interfere with the handling and installation of the filter stacks in the narrow confines of the filter housing. Additional attention must be given to insure that the sealing cup is properly aligned with the end of the filter unit to maintain seal integrity. Typical sheet metal sealing cups also have non-finished edges that may have burrs or uneven surface edges that can be detrimental to seal integrity.

Since the spring-loaded sealing cup is typically employed to seal string wound or molded depth type filters which require large axial loads to seal the ends of the filter units, the sealing cup is typically a relatively heavy and bulky unit and requires relatively large forces to compress the spring. In many instances, the relatively large forces may cause the filter unit to bow thereby damaging seal integrity.

OBJECTS AND SUMMARY OF THE INVENTION

Accordingly, it is an object of the present invention to provide a novel spring-loaded sealing connector which can be easily and quickly attached to the end of a filter unit.

It is another object to provide a sealing connector which provides a high quality seal.

It is a similar object to provide a sealing connector which maintains the proper alignment between the connector and the end connector in order to enhance the seal integrity of the filter system.

A further object is to provide a lightweight sealing connector that utilizes less spring sealing force to prevent damage to the filter units and make installation of the filter housing cover easier.

It is a further object of the present invention to provide a sealing connector which is a reusable, lightweight, and inexpensive to manufacture.

It is another object to provide a sealing connector which will attach with the end connector described in U.S. Pat. No. 5,141,637 to Reed et al.

Accordingly, the present invention provides a novel sealing connector for sealing a stack of filter units in a filter housing. The sealing connector has a base portion, a compression-generating member such as a spring attached to one side of the base portion, and a means for selectively attaching the base portion to the end connector of a filter unit. When the cover of the filter housing is closed, the cover compresses the spring so that the spring-generates a compressive axial load which creates a fluid-tight seal between not only the sealing connector and the end connector of the filter unit but also between the individual filter units of the filter stack and between the filter stack and the filter housing.

In the illustrated embodiment, the sealing connector has an annular, disk-shaped base portion having top and bottom sides. A tubular upright projection, disposed substantially in the center of the base, extends from the base for receiving the spring. The projection has a plurality of grooves on the outside walls to enhance the engagement with the spring. In order to create a high quality seal between the sealing connector and the filter unit, the bottom side of the base defines a sealing surface for engaging the filter unit. The sealing surface has a plurality of circular ridges projecting downwardly from the bottom side to localize and increase the pressure when they engage the sealing member of the end connector, thereby enhancing the seal between the sealing surface and the end connector.

In order to attach the sealing connector with the end connector, the illustrated embodiment of the sealing connector has a female attaching means for selectively attaching to the male connecting portion of the male end connectors. The male connecting portion of the male end connector is formed by an outer wall which extends from the base of the end connector and a plurality of latch members formed on and extending radially outward from the upper end of the outer wall.

The female attaching means has a female connecting portion forming an outer wall and a flange. The outer wall extends along the outer periphery of the base and extends outwardly from the base portion. The flange extends radially inward from the end of the wall. The outer wall and flange of the female attaching means form a socket for accepting the male connecting portion of the end connector.

In accordance with one of the objects, the sealing connector can be easily and quickly attached to the end of the filter unit. In order to attach the sealing connector to the end connector, the female attaching means of the sealing connector is substantially aligned with the male connecting portion of the male end connector and an axial force is exerted on the sealing connector and the end connector until the male connecting portion of the end connector enters the socket of the female attaching means of the sealing connector. Since the outer diameter of the latch member of the male end connector is slightly larger than the inner diameter of the flange of the sealing connector, the connecting portions of the sealing connector and/or the end connector are resilient so that they can bend slightly and permit the male connecting portion to slide into socket of the female attaching means. The male latch member engages and hooks the flange of the female attaching means so that the sealing connector is integrally attached to the male end connector and the sealing connector will not easily be disconnected.

In accordance with another object of the present invention, it will be appreciated that when the sealing connector is attached to the end connector, the alignment between the sealing surface and the sealing members will be properly maintained.

In accordance with yet another object of the present invention, the sealing connector is reusable. In order to disconnect the sealing connector and the end connector for reuse, a bending force is exerted on the sealing connector and the end connector so that the latch member of the male connecting portion can be detached from the socket of the female attaching means.

These and other features and advantages of the invention will be more readily apparent upon reading the following description of a preferred exemplified embodiment of the invention and upon reference to the accompanying drawings wherein:

DETAILED DESCRIPTION OF THE PREFERRED EMBODIMENT

Turning now to the drawings, FIGS. 1-4 illustrate longitudinal cross-sectional views of two conventional filter units 10 connected end to end and mounted in the base 13 of a conventional filter housing (not shown). Although the filter housing may accommodate a plurality of stacks of connected filters 10, only one two-high stack is, shown in order to simplify the figures.

Each filter unit 10 may include a filter element 11, such as a pleated element or a hollow, cylindrical mass of fibers, mounted on a cylindrical perforated core 12 having two end connectors 20, 30. In the illustrated embodiment, the fluid to be filtered flows, as illustrated by the arrows, outside-in through the filter element 11, through the perforated hollow core 12, where it drains through the base 13 of the housing.

The filter stack is formed by connecting the individual filter units 10 end to end by any conventional means including, for example, the male and female end connectors described in greater detail in U.S. Pat. No. 5,141,637 to Reed et al. which is incorporated by reference. Briefly, however, the male end connector 20 of the lower filter unit 10 in FIG. 1 mates with and attaches to the female end connector 30 of the upper filter unit 10. In order to prevent the unfiltered fluid from bypassing the filter element 11, at least one of the mating end connectors 20, 30 is equipped with a seal member for providing a fluid-tight seal. In the illustrated embodiment, the seal member is a flat gasket 17. Alternatively, the seal member may be any member which forms a fluid-tight seal between adjoining end connectors 20, 30 including, for example, a packing or an O-ring.

Figure 1:
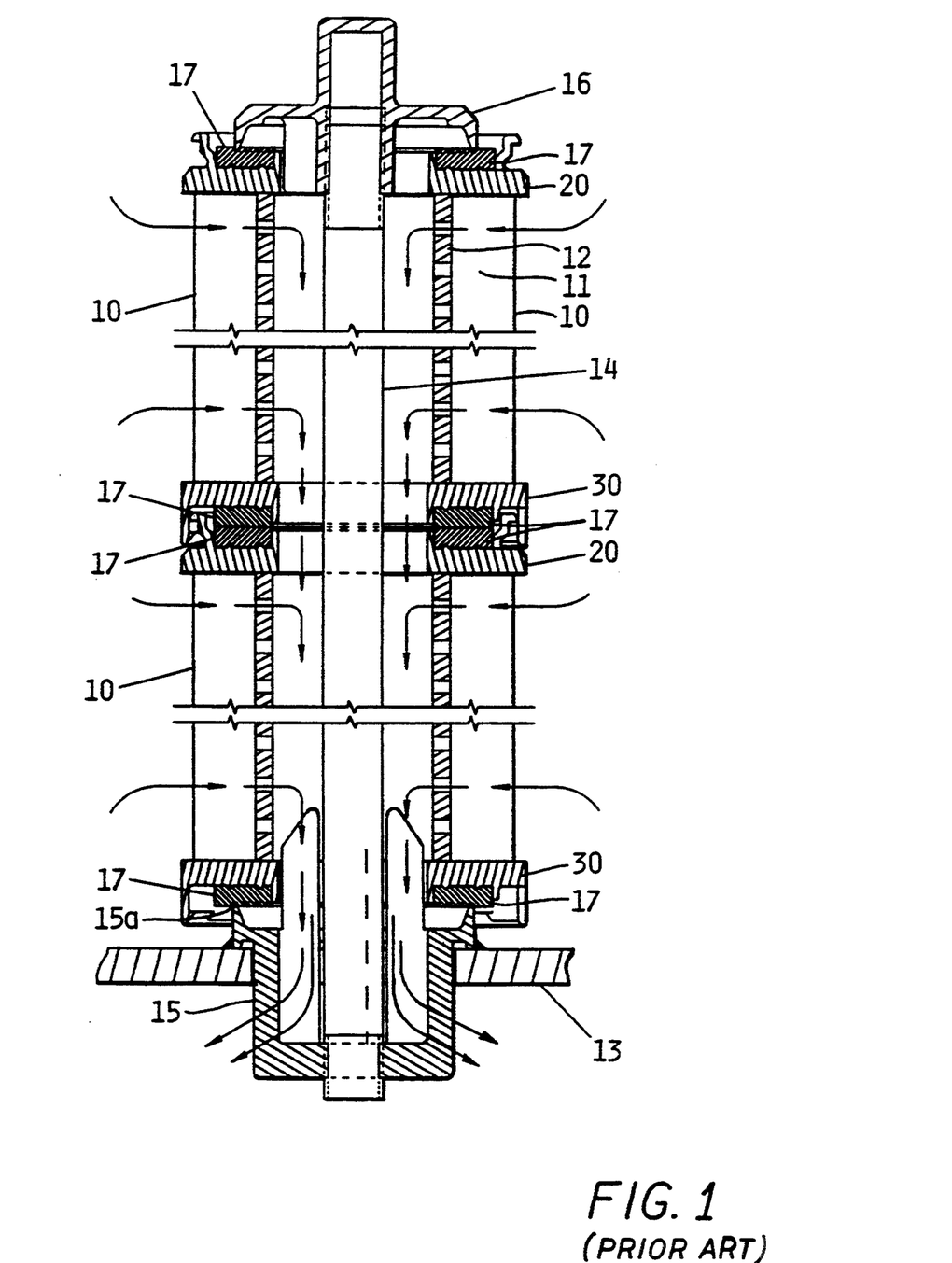
FIG. 1 is a longitudinal cross-sectional view of a filter system comprising two conventional filter units mounted end to end and a conventional tie rod sealing mechanism.
Figure 2:
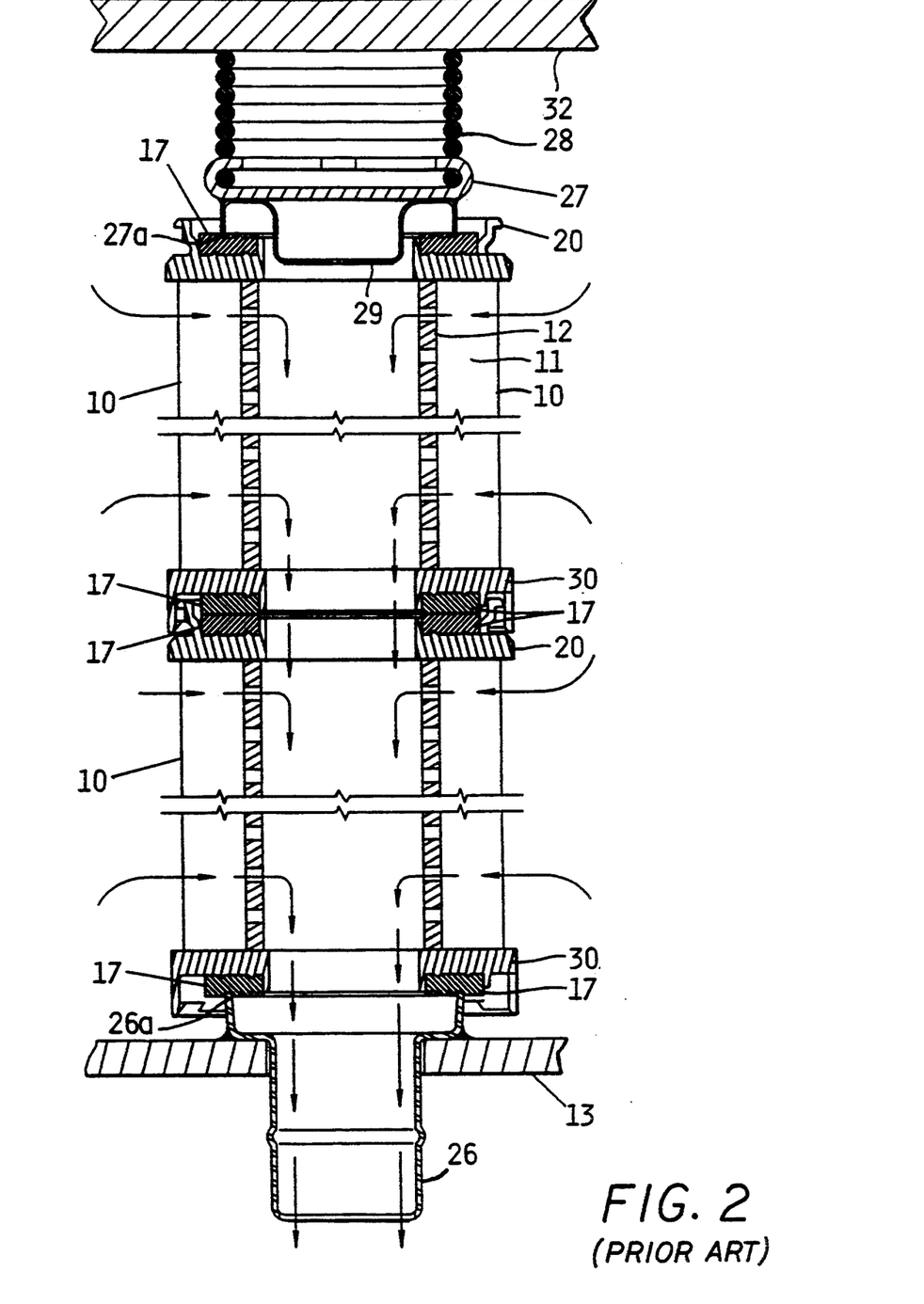
FIG. 2 is a longitudinal cross-sectional view of a filter system comprising two conventional filter units mounted end to end and a conventional spring-loaded sealing mechanism.

The seal members 17 of the mating connectors 20, 30 are pressed into sealing contact with each other and the end connectors 20, 30 by a compression-generating member such as the tie rod sealing system shown in FIG. 1 or the spring-loaded sealing system shown in FIG. 2.

In the conventional tie rod sealing system of FIG. 1, tie rod 14 has attachment means such as threads at each end. The bottom end of the tie rod 14 is securely attached to adapter 15 located in the base 13 of the filter housing so that the tie rod 14 is supported by the base 13 and the hollow core 12 of the filter unit 10 can be placed over the tie rod 14. In the illustrated embodiment, the compression generating member is seal nut 16 which generates a compressive force as it is screwed onto the tie rod 14. In order to prevent influent fluid from bypassing the filter unit 10 to the clean downstream side without first passing through the filter medium 11, the seal nut 16 can be screwed onto the thread end of the tie rod 14 thereby creating a compressive force between (1) the sealing member 17 of the male end connector 20 of the upper filter unit 10 and the seal nut 16, (2) the sealing members 17 of the end connectors 20, 30 located between the upper and lower filter units 10, and (3) the sealing member 17 of the female end connector 30 of the lower filter unit 10 and the adapter 15. The circumferential ridge 15a of the adapter 15 insures that a fluid-tight seal is created between the sealing member 17 of the female end connector 30 of the lower filter unit 10 and the adapter 15.

As previously mentioned, the tie rod system may have disadvantages. First, the tie rod 14 may decrease the efficiency of the filter system because the presence of the tie rod 14 in the hollow core of the filter unit may decrease the flow rate of the fluid. Further, the material, design, and manufacturing costs of the tie rod system can be relatively expensive because, for example, different length tie rods must be stocked in order to accommodate filter stacks of different sizes and heights and the tie rod 14 must be designed in conjunction with the filter housing so that the filter housing can receive the tie rod 14. In addition, installation the tie rods 14 can be significantly time consuming due to the numerous number of filter stacks which must be installed in the typical filter housing.

In the conventional spring-loaded sealing system shown in FIG. 2, the connected stack of filter units 10 is installed into filter housing so that the end connector 30 of the lower filter unit 10 engages the filter housing adapter 26 located in the base 13 of the filter housing. The housing adapter 26 has a circumferential ridge 26a which engages the sealing member 17. A sealing cup 27 having a circumferential ridge 27a and a center portion 29 is placed on top of each stack of filters so that the center portion 29 loosely engages the inside diameter of the end connector 20 and the circumferential ridge 27a loosely engages the seal member 17. In the illustrated embodiment, the compression generating member is spring 28 which is attached to the sealing cup 27.

In order to seal the filter stacks, the cover 32 of the filter housing is closed, thereby compressing the spring 28 as shown in FIG. 2 and creating an axial load onto filter seals 17. The axial load creates a compressive force and a fluid-tight seal between (1) the sealing member 17 of the male end connector 20 of the upper filter unit 10 and the sealing cup 27, (2) the sealing members 17 of the end connectors 20, 30 located between the upper and lower filter units 10, and (3) the sealing member 17 of the female end connector 30 of the lower filter unit 10 and the housing adapter 26. The circumferential ridge 26a of the housing adapter 26 insures that a fluid-tight seal is created between the sealing member 17 of the female end connector 30 of the lower filter unit 10 and the housing adapter 26.

The spring-loaded sealing mechanism also has several disadvantages. It will be appreciated that the circumferential ridge 27a of the sealing cup 27 must be properly aligned with the seal member 17 to maintain seal integrity between the sealing cup 27 and the seal member 17. Unfortunately, during installation of the numerous stacks of filter units 10 in the filter housing, the alignment between the sealing cup 27 and the sealing member 17 is easily disturbed thereby permitting contaminated influent to bypass the filter element 11 and contaminating the clean downstream fluid. Seal integrity can also be degraded by manufacturing imperfections such as burrs or uneven edge surfaces. Also, it can be difficult to close the cover 32 because there are numerous filter stacks having an associated sealing cup 27 and each sealing cup 27 requires a relatively large axial load to compress the spring 28.

In accordance with one of the objects of the present invention, a novel and improved sealing connector 60 is provided which can be easily and quickly attached to the end of the filter stack. Unlike the conventional sealing mechanisms, the sealing connector 60 of the present invention can be selectively attached to an individual filter unit during or prior to installation so that the sealing connector 60 will not fall off or otherwise interfere with the installation of the filter housing. Furthermore, the sealing connector 60 will also insure that the sealing connector 60 and the end connector are properly aligned to maintain seal integrity.

Figure 3:
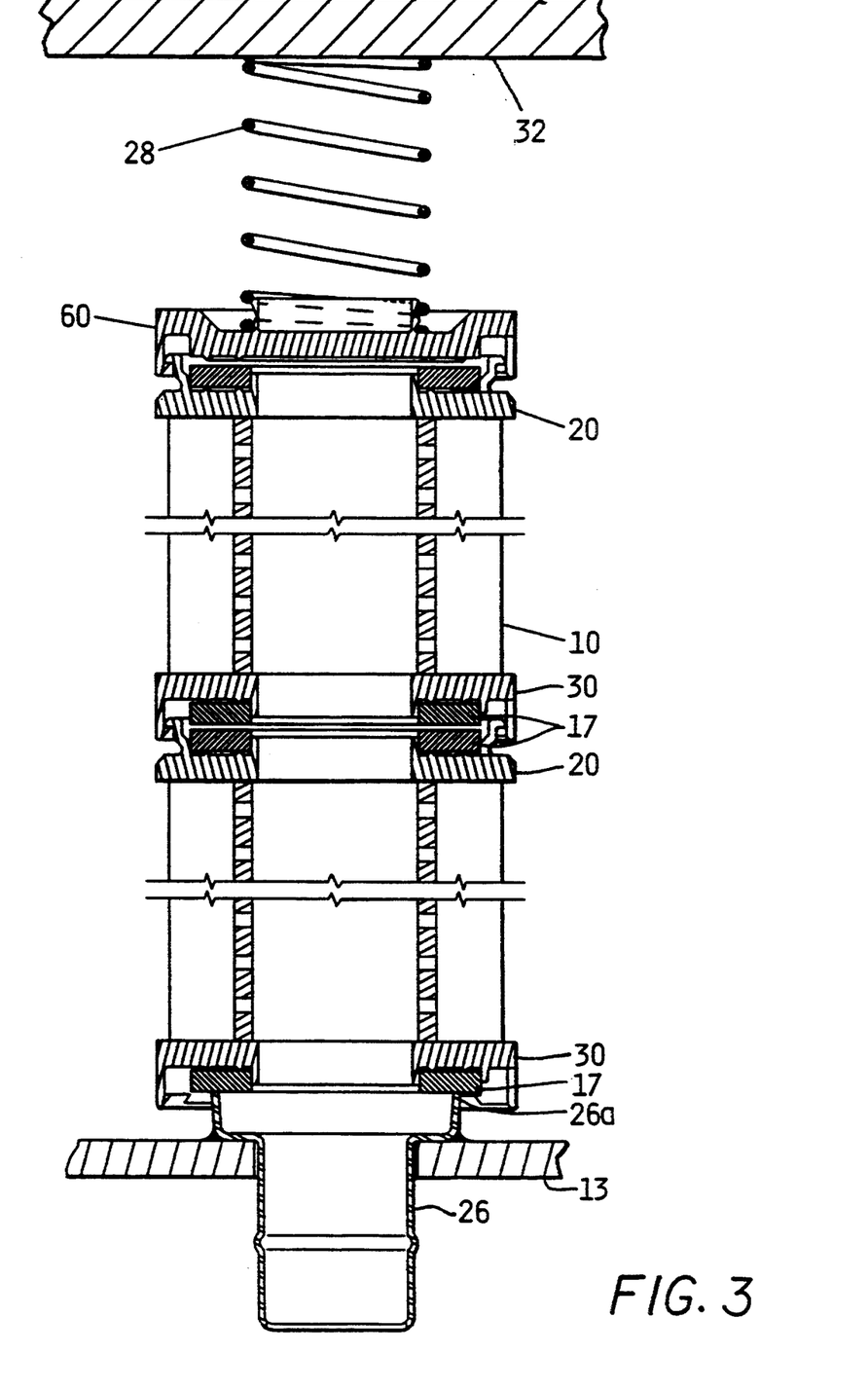
FIG. 3 is a longitudinal cross-sectional view of a filter system comprising two conventional filter units mounted end to end and an embodiment of a sealing connector in accordance with the present invention before the filter housing cover is closed.
Figure 4:
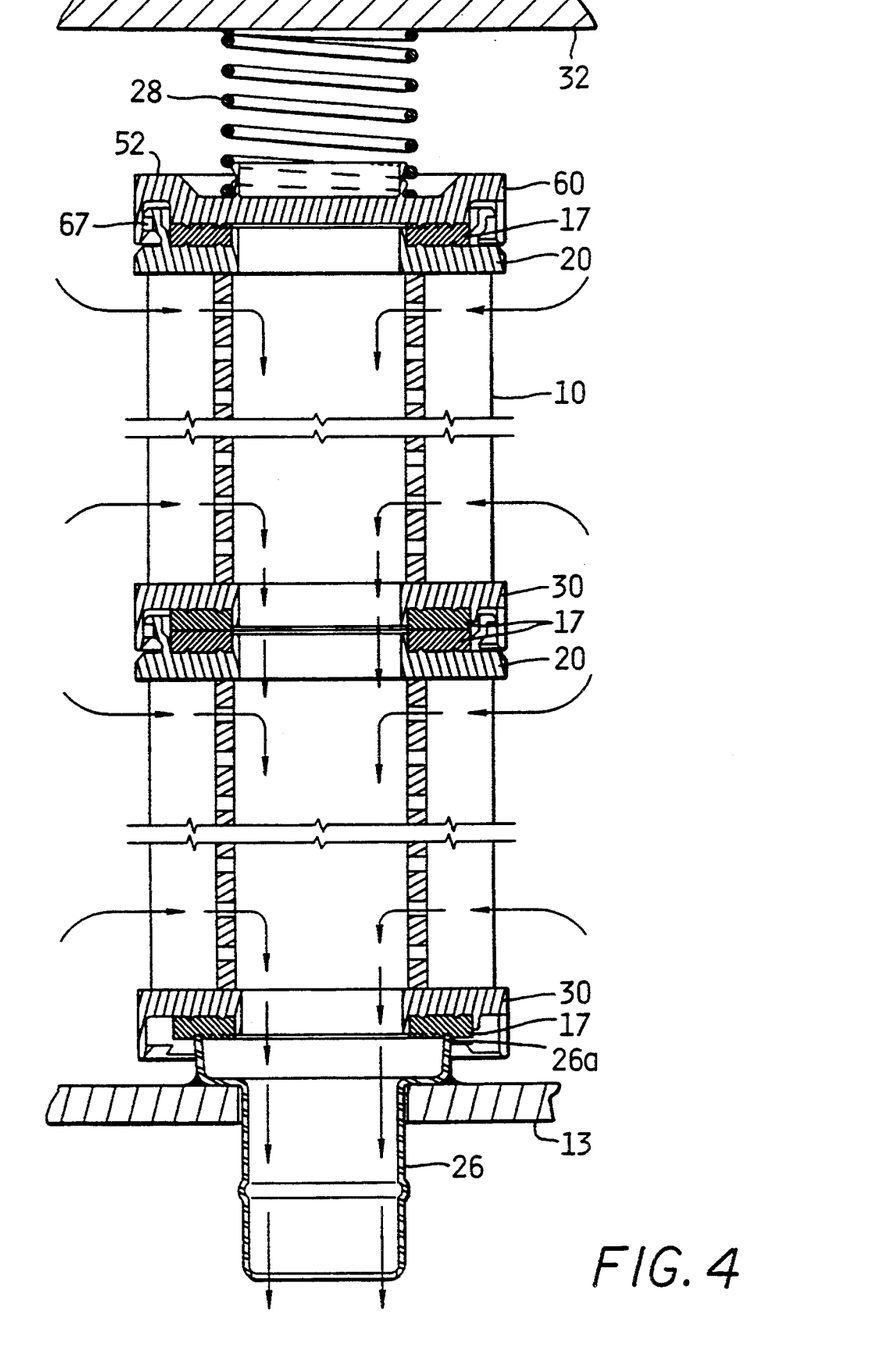
FIG. 4 is a longitudinal cross-sectional view of the filter system shown in FIG. 3 after the filter housing cover is closed.

Referring to the drawings, FIG. 3 illustrates a longitudinal cross-sectional view of a filter system having two conventional filter units 10 loaded into a filter housing without the cover 32 and one embodiment of the sealing connector 60 of the present invention attached to the male end connector 20 of the upper filter unit 10. FIG. 4 shows a similar view illustrating the filter system when the housing cover 32 is closed. It will be appreciated each sealing connector 60 can be attached to an associated filter stack, each filter stack having at least one filter unit 10.

The sealing connector 60 has a base 62 having means for selectively attaching the base 62 to the end of the filter unit 10 and a compression-generating member for providing an axial load on the filter stack. In the embodiment best shown in FIGS. 5-6, the base 62 is an annular, disk-shaped portion having top and bottom sides. An upright projection 63 extends upwardly from the top side of the base 62 for receiving a compression generating member such as a spring 28. The projection 63 preferably has a tubular cross-section in order to reduce the weight of the sealing connector 60. It is also preferable to have a slit (not shown) in the walls of the projection 63 to permit drainage of fluids. When the cover 32 is closed as shown in FIG. 4, the cover 32 compresses the spring 28 so that the spring 28 generates an axial load on the base 62. The upright projection 63 is generally disposed in the center of the base 62 so that the compressed spring 28 will produce an evenly distributed axial load on the base 62. A plurality of grooves 63a for receiving the spring 28 are disposed on the outer surface of the upright projection 63 thereby providing better engagement between the spring 28 and the upright projection 63.

In accordance with one of the objects of the present invention, the sealing connector 60 provides a high quality seal with the filter unit 10. In order to create a fluid-tight seal between the sealing connector 60 and the end connector 20 of a filter unit 10, the bottom side of the base 62 has a sealing surface 61 which engages the end connector 20 of the filter unit 10. In the illustrated embodiment, the sealing surface 61 engages the sealing member 17 located in the male end connector 20 of the top filter unit 10. It will be appreciated that the sealing member 17 could also be associated with sealing connector 60 instead of the end connector 20. The sealing surface 61 has a plurality of circular ridges 64 projecting downwardly from the bottom side to localize and increase the pressure and enhance the seal between the sealing surface 61 and the seal member 17. When the cover 32 of the filter housing is closed, the cover 32 compresses the spring 28, thereby creating an axial load on the base 62, compressing the sealing surface 61 and ridges 64 into the sealing members 17, and creating a fluid-tight seal between the sealing connector 60 and the end connector 20 of the upper filter unit 10.

In order to permit the sealing connector 60 of the present invention to be attached to the filter unit 10, the sealing connector 60 has means for selectively attaching the base 62 to the end connector of the filter unit 10. Conventional end connectors will typically be of the "male" or "female" type. For illustrative purposes, an embodiment of a sealing connector 60 in accordance with the invention is presented in FIGS. 3–6 which is capable of being attached to a "male" end connector of the type described in greater detail in U.S. Pat. No. 5,141,637 to Reed et al. Because the illustrated end connector is the "male" type, it will be appreciated that a "female" attaching means is required. Therefore, in the discussion of this embodiment, the attaching means will be referred to as a "female attaching means." In alternative embodiments, which are not shown, the end connector could be of the "female" type in which case a "male" attaching means would be required.

Figure 5:
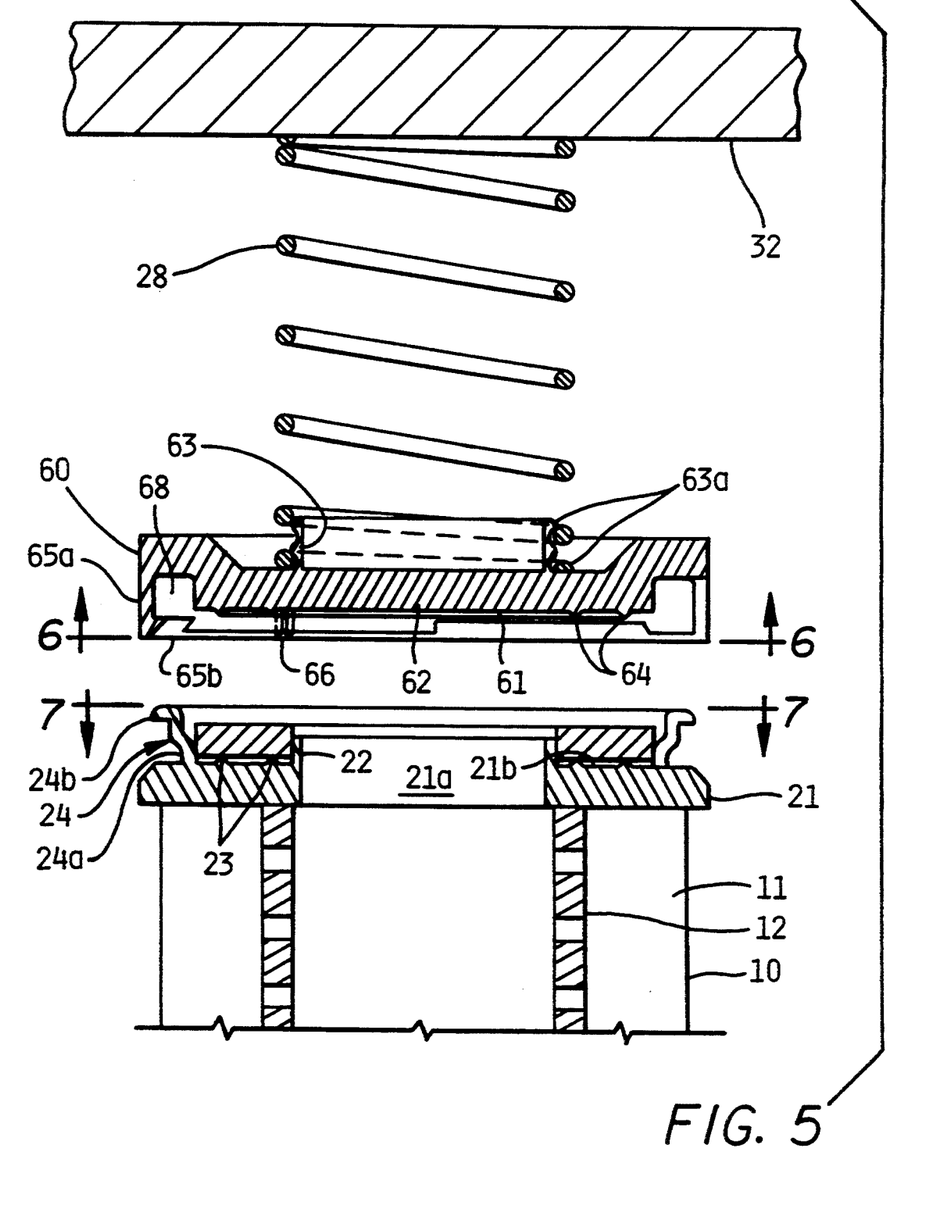
FIG. 5 is an enlarged cross-sectional view of the sealing connector and a conventional end connector of a filter unit shown in FIGS. 3 and 4.
Figure 7:
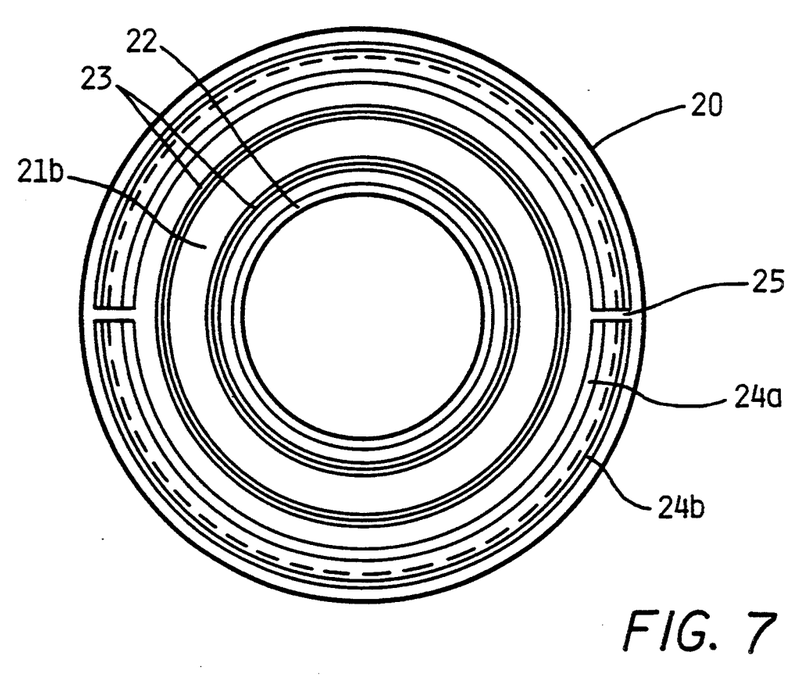
FIG. 7 is a top plan view of the male end connector of the filter unit taken along line 7—7 in FIG. 5.

The conventional male end connector 20 shown in FIGS. 5 and 7 has an annular, disk-shaped base 21 with a hole 21a at its center that serves as a port for fluid flow. A cylindrical inner wall 22 surrounds the central hole 21a. A connecting portion 24, located radially outward from the inner wall 22, extends upwards from the upper surface of the base portion 21. The space between the inner wall 22 and connecting portion 24 defines a compartment for a flat, annular sealing member 17 such as a gasket. In order to form a fluid-tight seal, the upper surface of the compartment defines a sealing surface 21b which engages the sealing member 17 and has a plurality of upwardly projecting circular ridges 23 for localizing and increasing the pressure and enhancing the seal between the sealing surface 21b and seal member 17.

The connecting portion 24 is adapted to permit the male end connector 20 and the female attaching means to attach to each other. The connecting portion 24 comprises an outer wall 24a extending from the base 21 and a plurality of latch members in the form of arcuate flanges 24b formed on and extending radially outward from the upper end of outer wall 24a. As viewed in the FIG. 7, each flange 24b extends in the circumferential direction of the base 21 over an arc of a circle and is separated by slits 25 which extend from the top of the connecting portion 24 to the base 21. The slits 25 permit the drainage of fluids which would otherwise be accumulated between the mated sealing connector 60 and the end connector 20. In addition, the slits 25 provide for greater flexibility of the connecting portion 24 making it easier to engage and disengage the end connector 20 and the female attaching means of the sealing connector 60. In the present embodiment, each connecting portion 24 extends approximately 177° in the circumferential direction, and each slit 25 spans approximately 3°. However, the number and spacing of the connecting portion 24 and the length of each connecting portion 24 in the circumferential direction are not critical and will depend on factors such as the desired strength and flexibility of the connecting portion 24.

Figure 6:
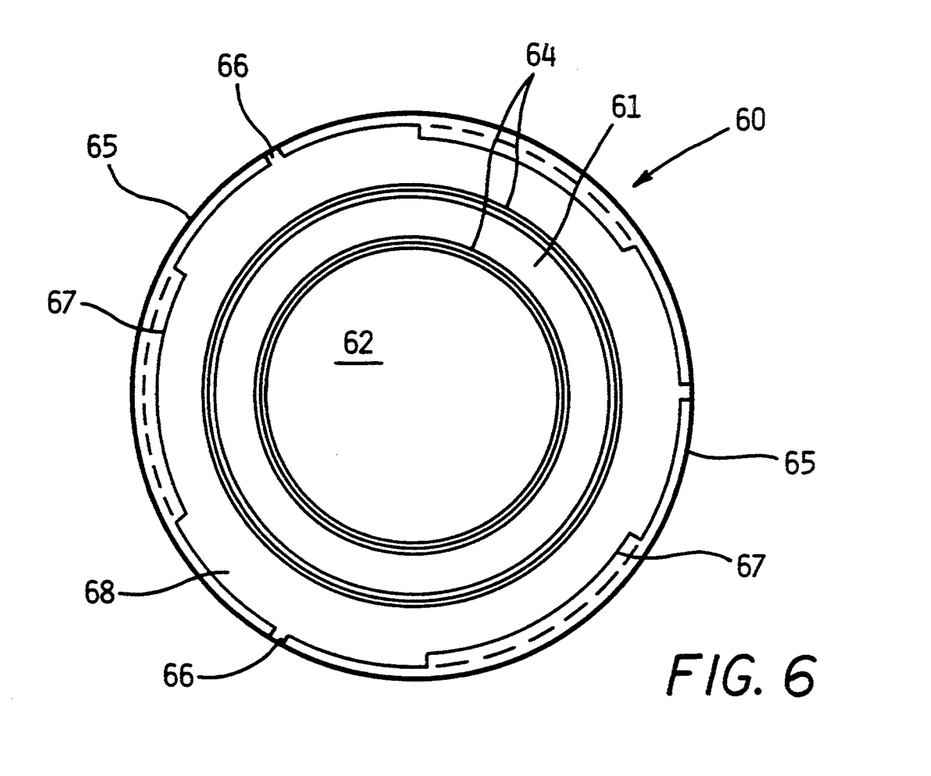
FIG. 6 is bottom plan view of the sealing connector taken along line 6—6 in FIG. 5.

In the illustrated embodiment, the female attaching means of the female sealing connector 60 has a connecting portion 65 for selectively attaching to the connecting portion 24 of end connector 20. Referring to FIGS. 5–6, it will be seen that the connecting portion 65 is formed by a cylindrical wall 65a and a flange 65b. The wall 65a extends from the bottom surface of the base 62 along its outer periphery. The flange 65b, which is formed on the upper end of the outer wall 65a and projects radially inward from the outer wall 65a, has a generally arcuate configuration. The flange 65b serves as the latch member of the sealing connector 60 for engagement with the flanges 24a of the connecting portion 24 of the male end connector 20. Each flange 65b extends over an arc of a circle, preferably at intervals in the circumferential direction of the outer wall 65a. In the illustrated embodiment, each flange 65b extends for approximately 60°, but the length and disposition of the flanges 65b can be varied.

The space defined by the outer wall 65a, the flange 65b and the base 61 serves as a socket 68 for receiving the connecting portion 24 of the male end connector 20. The socket 68 extends without obstructions for 360 degrees around the female attaching means 60 so that the sealingly connector 60 and the male end connector 20 can be freely rotated with respect to one another when the gaskets 17 are not under compression. By allowing relative rotation of the end connector 20 and the sealing connector 60, it is possible to prevent damage if a torque should be applied to one filter unit 10 of the stack installation.

The outer wall 65a is preferably interrupted periodically by slits 66 which extend from the top of the outer wall 65a to the base 61. The slits 66 in the outer wall 65a serve the same purpose as the slits 25 in the connecting portion 24, allowing fluid drainage and increasing the flexibility of the outer wall 65a. In the illustrated embodiment, the slits divide the outer wall 65a into three sections; the three sections collectively extend for approximately 324° along the periphery of the base 61 and the slits 66 collectively span approximately 6 degrees. However, the circumferential length of each section of the outer wall 65a and the width of the slits 66 is not critical.

In accordance with one of the objects of the present invention, the sealing connector 60 can be easily and quickly attached to the filter unit 10. In order to install the sealing connector 60, the sealing connector 60 is attached to the filter unit 10 by generally aligning the connecting portions 24, 65 of the male end connector 20 and the female attaching means, respectively, and then exerting an axial force on the sealing connector 60 and the male end connector 20 until the connecting portions 24 on the male end connector 20 enter the socket 68 of the female attaching means.

The diameter at the inner periphery of the flanges 65b of the female attaching means is slightly smaller than the diameter at the outer periphery of the flanges 24b of the male end connector 20. Therefore, in order to insert the connecting portion 24 into the socket 68, the connecting portion 24 of the male end connector 20 and/or the connecting portion 65 of the female attaching means must bend enough in the radial direction for flange 24a of the connecting portions 24 to slide past flanges 65b of the connecting portion 65 of the female attaching means. To help guide flanges 24b into the socket 68, the outer periphery of the flanges 24b and the inner periphery of the flanges 65b are bevelled. Once the flanges 24b of the connecting portion 24 have slid past the flanges 65b of the connecting portion 65, the connecting portions 24, 65a spring back to their original positions. The thickness of the walls of the connecting portions 24, 65 and the circumferential spacing of the slits 25, 66 are chosen so that either of the connecting portions 24 or 65 can deflect radially by the required amount, thereby permitting flanges 24b to engagement and latch with the flanges 65b without excessive stresses being exerted thereon.

Once flanges 24b of the male end connector 20 have been inserted into the socket 68 of the female attaching means, flanges 24b and flanges 65b overlap one another in the radial direction. In accordance with one of the objects, the amount of overlap of the flanges 24a, 65b is sufficient to attach the male end connector 20 and the sealing connector 60 together and prevent them from becoming easily disconnected from one another. Since the sealing connector 60 will not be easily disconnected, it can be attached to the stack of filter units 10 before or after the filter stack is installed in the filter housing.

In accordance with another of the objects, it will be appreciated that, once the sealing connector 60 is attached to the end connector 20, the sealing surface 61 will be simultaneously aligned with the sealing member 17 thereby insuring that seal integrity will be maintained between the sealing connector 60 and the end connector 20. Unlike conventional sealing mechanisms, the sealing connector 60 of the present invention can not be misaligned during installation. Similarly, the sealing connector 60 will not fall off during installation, thereby interfering with the installation of numerous filter stacks in the filter housing.

Once the sealing connector 60 has been attached to the stack of filter units 10 to form the filter system, the filter system can be lowered into the filter housing so that the female end connector 30 of the bottom filter unit 10 engages the circumferential edge 26a of the filter housing adapter 26. In order to create a fluid-tight seal in the filter system, the cover 32 is closed as shown in FIG. 4. The cover 32 activates the compression-generating member by compressing the spring 28 and exerting an axial sealing force on the filter system. The axial load creates a fluid-tight seal between (1) the sealing surface 61 of the sealing connector 60 and the sealing member 17 of the male end connector 20 of the upper filter unit 10, (2) the sealing members 17 of the end connectors 20, 30 located between the upper and lower filter units 10, and (3) the sealing member 17 of the female end connector 30 of the lower filter unit 10 and the circumferential ridge 26a of the housing adapter 26. Once the filter system has been properly sealed and installed, fluid (liquid or gas) may be directed through the stack of filter units.

Thus, it will be appreciated in accordance with one of the objects of the invention, a high quality fluid-tight seal between mated end connector 20 and sealing connector 60 is attained by compression of the gasket 17 against the sealing surfaces 21b, 61. In the preferred embodiment, the compressive force is produced substantially entirely by the cover 32 and the compression-generating member and substantially no compressive force is exerted by the connecting portions 24, 65 of the end connector 20 and the sealing connector 60, respectively. A gap 67 may even develop between the flanges 24b, 65b when the compression-generating member presses the gaskets 17 into sealing contact with the sealing surfaces 21b and 61.

In accordance with another object of the present invention, the sealing connector 60 is reusable and can be selectively detached from the filter stack. The connecting portions 24 of the male end connector 20 and the connecting portion 65 of the sealing connector 60 are sufficiently flexible so that they can be disconnected from one another when desired by manually exerting a bending load on the connected sealing connector 60 and end connector 20. The male end connector 20 and the sealing connector 60 are preferably sufficiently durable to be disconnected without damage to connecting portions 24, 65. Similarly, the connecting portion 65 of the sealing connector 60 is preferably strong enough to support the weight of the filter stack so that the sealing connector 60 can lift the stack without damage.

The entire sealing connector 60 is preferably an integral member and can be formed of any suitable material such as molded plastic. It will be appreciated that a loose fit between the sealing members 60 and the male end connector 20 is typically more desirable because the tolerances and costs for a loose fit, compared with a snug fit, are less stringent permitting the sealing connectors 60 to be easily and inexpensively manufactured. However, the dimensions of the sealing connector 60 can be designed to snugly or loosely engage the male end connector 20 as long as the seal integrity between the sealing surface 61 and the male end connector 20 is properly maintained. In the illustrated embodiment, for example, the sealing ridges 64 should be properly aligned in the radial direction with the sealing gasket 17 of the male end connector 20 so that the axial load will create a fluid-tight seal.

Unlike conventional spring-loaded sealing mechanisms, the sealing connector 60 of the present invention provides a high quality seal and the alignment is always maintained so that the loads acting on the attaching means of the sealing connector 60 are relatively small and there is little likelihood of the connecting portion 65 breaking, further enhancing the reliability of the relatively light-weight structures.

While the invention has been described and disclosed in connection with certain preferred embodiments and procedures, it is not intended to limit the invention to those specific embodiments. Rather it is intended to cover all such alternative embodiments and modifications as fall within the spirit and scope of the invention. The present invention is intended to cover a sealing connector 60 which can be attached to any type of end connector. Although the illustrated embodiment described a "female" sealing connector 60 for use with male end connector 20, it will be appreciated that the attaching means of the sealing connector 60 can be modified to adapt to any filter unit 10. By way of example only, the embodiment of the sealing connector 60 illustrated in FIG. 3 can be modified to provide a "male" attaching means for selectively attaching to the female end connector 30 of the lower filter unit 10. Similarly, the "female" flange 65b, facing the radially inward in FIG. 5, can be located closer to the center of the base portion 62 and be made to face radially outward, resulting in a "male" flange which can be designed to fit into and engage a connecting portion disposed on the hole 21a of the end connector 20 or the hollow core 12 of the filter unit 10.

What is claimed is:

1. A sealing connector for attaching to an end connector of a filter unit for sealing the filter unit in a filter housing, the end connector having a seal member and a connecting portion forming a latch member, the sealing connector comprising:

a base having top and bottom sides, a compression-generating member attached to the one of the sides for generating a substantially axial load on the sealing connector and the filter unit, and a radially deformable attachment member for selectively attaching the base to the connecting portion of the end connector, the attachment member having a latch member for aligning with and selectively attaching to the latch member of the end connector; said latch members of the end connector and attachment member being disposed such that said attachment member radially deforms in response to an axial load exerted thereon, to permit the latch members of the attachment member an the end connector to axially slide past each other and overlap in a radial direction for integrally attaching the sealing connector to the end connector; and one side of the base having a sealing surface for engaging the end connector and creating a fluid-tight seal between the sealing connector and the end connector when the compression generating member creates the axial load.

2. The invention set forth in claim 1 wherein the attachment member and the connecting member resiliently cooperate with each other to permit the latch members of the attachment member and the end connector to slide past each other and overlap in a radial direction when an axial force is exerted on the aligned latch members for integrally attaching the sealing connector to the end connector.

3. The invention set forth in claim 2 wherein the attachment member has a wall extending around the periphery of the base and the latch member of the attachment member is formed by a flange extending away from the wall.

4. The invention set forth in claim 3 wherein the flange extends radially inward for attaching to the latch member of the end connector extending radially outward.

5. The invention set forth in claim 4 wherein the flange of the attachment member has an inner diameter which is smaller than an outer diameter of the latch member of the end connector, and the attachment member and the connecting member resiliently cooperate with each other to permit the latch members to slide past each other when an axial force is exerted on the aligned latch members for permitting the latch members to overlap each other.

6. The invention set forth in claim 3 wherein the flange extends radially outward for attaching to the latch member of the end connector extending radially inward.

7. The invention set forth in claim 6 wherein the flange of the attachment member has an outer diameter which is larger than an inner diameter of the latch member of the end connector, and the attachment member and the connecting member resiliently cooperate with each other to permit the latch members to slide past each other when an axial force is exerted on the aligned latch members for overlapping each other.

8. The invention set forth in claim 3 wherein the wall has a generally cylindrical configuration and the flange has a generally arcuate configuration.

9. The invention set forth in claim 1 wherein the compression-generating member comprises a spring attached to a projection extending outwardly from the base portion and disposed substantially in the center of the base to evenly distribute the axial load.

10. The invention set forth in claim 9 wherein the projection has a generally tubular configuration and a slit in the projection for drainage of fluids.

11. The invention set forth in claim 1 wherein the sealing connector can be detached from the end connector by exerting a bending load between the sealing connector and the end connector.

12. The invention set forth in claim 1 wherein the sealing surface has a plurality of projection ridges for engaging the end connector and increasing the sealing pressure between the sealing surface and the end connector.

13. A filter system comprising:
a filter stack comprising at least one filter unit having an end connector, the end connector having a seal member and a connecting portion forming a latch member, and
a sealing connector for attaching to the end connector for sealing the filter system in a filter housing, the sealing connector comprising:
a base having top and bottom sides, a compression-generating member attached to the one of the sides for generating a substantially axial load on the sealing connector and the filter unit, and a radially deformable attachment member for selectively attaching the base to the connecting portion of the end connector, the attachment member having a latch member for aligning with and selectively attaching to the latch member of the end connector, said latch members of the end connector and attachment member being disposed such that said attachment member radially deforms in response to an axial load exerted thereon, to permit the latch members of the attachment and the end connector to axially slide past each other and overlap in a radial direction for integrally attaching the sealing connector to the end connector; and
one side of the base having a sealing surface for engaging the end connector and creating a fluid-tight seal between the sealing connector and the end connector when the compression generating member creates the axial load.

14. The invention set forth in claim 13 wherein at least one of the attaching means or the connecting portion of the end connector is resilient to permit the latch members of the attaching means and the end connector to slide past each other and overlap in a radial direction when an axial force is exerted on the aligned latch members for integrally attaching the sealing connector to the end connector.

15. The invention set forth in claim 14 wherein the attaching means has a wall extending around the periphery of the base and the latch member of the attaching means is formed by a flange extending away from the wall.

16. The invention set forth in claim 15 wherein the flange extends radially inward for attaching to the latch member of the end connector extending radially outward.

17. The invention set forth in claim 16 wherein the inner diameter of the flange of the attaching means is slightly smaller than the outer diameter of the latch member of the end connector, and at least one of the attaching means or the connecting portion of the end connector is resilient to permit the latch members to slide past each other when an axial force is exerted on the aligned latch members for permitting the latch members to overlap each other.

18. The invention set forth in claim 15 wherein the flange extends radially outward for attaching to the latch member of the end connector extending radially inward.

19. The invention set forth in claim 18 wherein the outer diameter of the flange of the attaching means is slightly larger than the inner diameter of the latch member of the end connector, and at least one of the attaching means or the connecting portion of the end connector is resilient to permit the latch members to slide past each other when an axial force is exerted on the aligned latch members for overlapping each other.

20. The invention set forth in claim 15 wherein the wall has a generally cylindrical configuration and the flange has a generally arcuate configuration.

21. The invention set forth in claim 13 wherein the compression-generating member comprises a spring attached to a projection extending outwardly from the base portion and disposed substantially in the center of the base to evenly distribute the axial load.

22. The invention set forth in claim 21 wherein the projection has a generally tubular configuration and a slit in the projection for drainage of fluids.

23. The invention set forth in claim 13 wherein the sealing connector can be detached from the end connector by exerting a bending load between the sealing connector and the end connector.

24. The invention set forth in claim 13 wherein the sealing surface has a plurality of projection ridges for engaging the end connector and increasing the sealing force between the sealing surface and the end connector.

25. A sealing connector for attaching to an end connector of a filter unit for sealing the filter unit in a filter housing, the end connector having a seal member and a connecting portion forming a latch member, the sealing connector comprising:

a base having top and bottom sides, a compression-generating member attached to the one of the sides for generating a substantially axial load on the sealing connector and the filter unit, and an attachment member for selectively attaching the base to the connecting portion of the end connector, the attachment member having a latch member for aligning with and selectively attaching to the latch member of the end connector in response to an axial load exerted thereon;

one side of the base having a sealing surface for engaging the end connector and creating a fluid-tight seal between the sealing connector and the end connector when the compression generating member creates the axial load;

the attachment member and the connecting member resiliently cooperating with each other to permit the latch members of the attachment member and the end connector to slide past each other and overlap in a radial direction when an axial force is exerted on the aligned latch members for integrally attaching the sealing connector to the end connector, and wherein the attachment member has a wall extending around the periphery of the base and the latch member of the attachment member is formed by a flange extending away from the wall.

26. A sealing connector for attaching to an end connector of a filter unit for sealing the filter unit in a filter housing, the end connector having a seal member and a connecting portion forming a latch member, the sealing connector comprising:

a base having top and bottom sides, a compression-generating member attached to the one of the sides for generating a substantially axial load on the sealing connector and the filter unit, and an attachment member for selectively attaching the base to the connecting portion of the end connector, the attachment member having a latch member for aligning width and selectively attaching to the latch member of the end connector in response to an axial load exerted thereon;

one side of the base having a sealing surface for engaging the end connector and creating a fluid-tight seal between the sealing connector and the end connector when the compression generating member creates the axial load;

the attachment member and the connecting member resiliently cooperating with each other to permit the latch meters of the attachment member and the end connector to slide past each other and overlap in a radial direction when an axial force is exerted on the aligned latch members for integrally attaching the sealing connector to the end connector, and wherein the compression-generating member comprises a spring attached to a projection extending outwardly from the base portion and disposed substantially in the center of the base to evenly distribute the axial load.

27. A filter system comprising:

a filter stack comprising at least one filter unit having an end connector, the end connector having a seal member and a connecting portion forming a latch member, and a sealing connector for attaching to the end connector for sealing the filter system in a filter housing, the sealing connector comprising:

a base having top and bottom sides, a compression-generating member attached to the one of the sides for generating a substantially axial load on the sealing connector and the filter unit, and means for selectively attaching the base to the connecting portion of the end connector, the attachment member having a latch member for aligning with and selectively attaching to the latch member of the end connector in response to an axial load exerted thereon;

one side of the base having a sealing surface for engaging the end connector and creating a fluid-tight seal between the sealing connector and the end connector when the compression generating member creates the axial load;

at least one of the attachment member or the connecting portion of the end connector being resilient to permit the latch members of the attachment member and the end connector to slide past each other and overlap in a radial direction when an axial force is exerted on the aligned latch members for integrally attaching the sealing connector to the end connector; and wherein the attachment member has a wall extending around the periphery of the base and the latch member of the attachment member is formed by a flange extending away from the wall.

28. A filter system comprising:

a filter stack comprising at least one filter unit having an end connector, the end connector having a seal member and a connecting portion forming a latch member, and a sealing connector for attaching to the end connector for sealing the filter system in a filter housing, the sealing connector comprising:

a base having top and bottom sides, a compression-generating member attached to the one of the sides for generating a substantially axial load on the sealing connector and the filter unit, and means for selectively attaching the base to the connecting portion of the end connector, the attachment member having a latch member for aligning with and selectively attaching to the latch member of the end connector in response to an axial load exerted thereon;

one side of the base having a sealing surface for engaging the end connector and creating a fluid-tight seal between the sealing connector and the end connector when the compression generating member creates the axial load;

at least one of the attachment member or the connecting portion of the end connector being resilient to permit the latch members of the attachment member and the end connector to slide past each other and overlap in a radial direction when an axial force is exerted on the aligned latch members for integrally attaching the sealing connector to the end connector; and wherein the compression-generating member comprises a spring attached to a projection extending outwardly from the base portion and disposed substantially in the center of the base to evenly distribute the axial load.

* * * * *

UNITED STATES PATENT AND TRADEMARK OFFICE
CERTIFICATE OF CORRECTION

PATENT NO. : 5,435,915

DATED : July 25, 1995

INVENTOR(S) : James T. Connors

Page 1 of 2

It is certified that error appears in the above-identified patent and that said Letters Patent is hereby corrected as shown below:

ON THE TITLE PAGE:

item [56] References Cited
U.S. PATENT DOCUMENTS
Second column, line 11, delete "5,205,994" and substitute therefor --5,203,994--.

Column 2, line 68, "connectors" should read --connector--;
Column 4, line 7, after "FIG. 5" delete the semicolon ";" and substitute therefor a period --.--;
Column 4, line 17, after "stack is" delete the comma ",";
Column 4, line 30, after "Reed et al." insert a comma --,--;
Column 5, line 40, "members" should read --member--; and
Column 7, line 38, "As viewed in the" should read --As viewed in--.

UNITED STATES PATENT AND TRADEMARK OFFICE
CERTIFICATE OF CORRECTION

PATENT NO. : 5,435,915
DATED : July 25, 1995
INVENTOR(S) : James T. Connors

It is certified that error appears in the above-identified patent and that said Letters Patent is hereby corrected as shown below:

Column 11, line 4, "member an" should read --member and--;
Column 12, lines 38, 40, 46, 48, 55-56, 58, delete "attaching means" and substitute therefor --attachment member--;
Column 12, line 57, starting with "at least" should be a new paragraph;
Column 13, lines 1-2 and 4, delete "attaching means" and substitute therefor --attachment member--;
Column 13, lines 35 and 67, delete "the";
Column 14, line 15, delete "meters" and substitute therefor --members--; and
Column 14, line 34, delete the first occurrence of "the".

Signed and Sealed this

Seventh Day of May, 1996

Attest:

BRUCE LEHMAN

Attesting Officer

Commissioner of Patents and Trademarks